Figure 1:
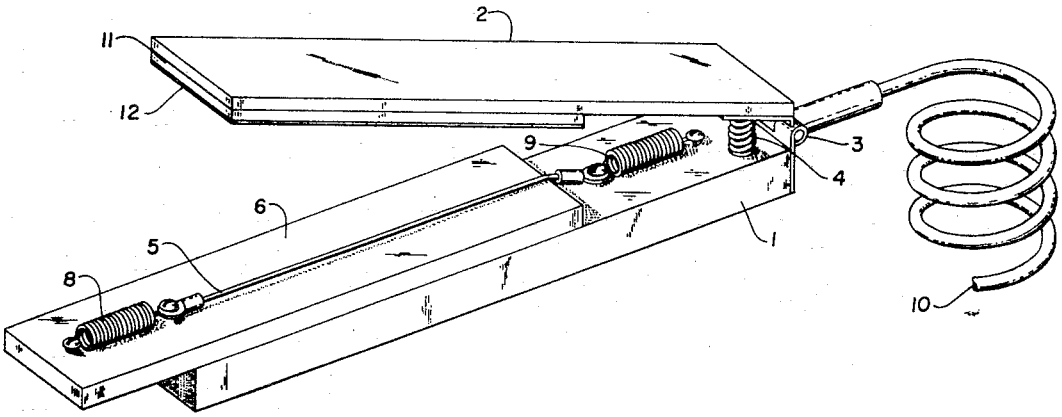
Figure 2:
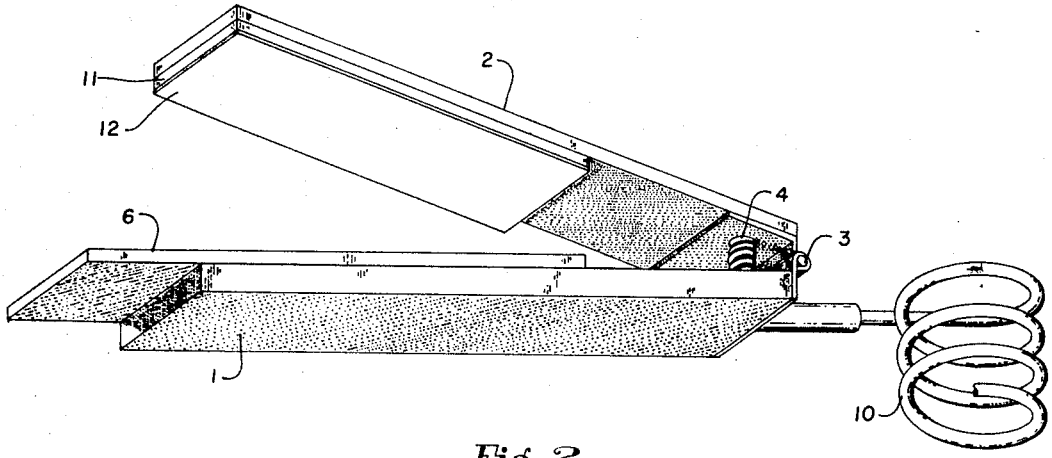
Figure 3:
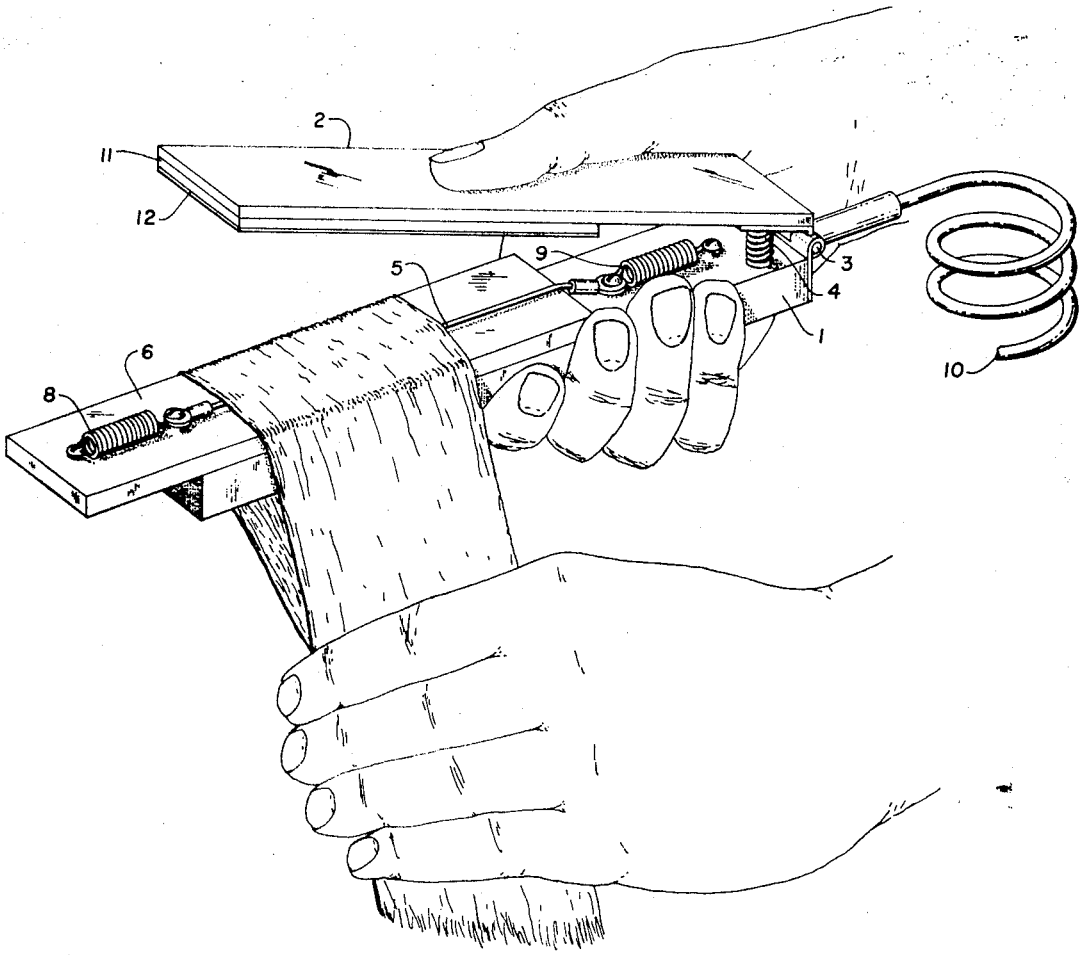
Figure 4:
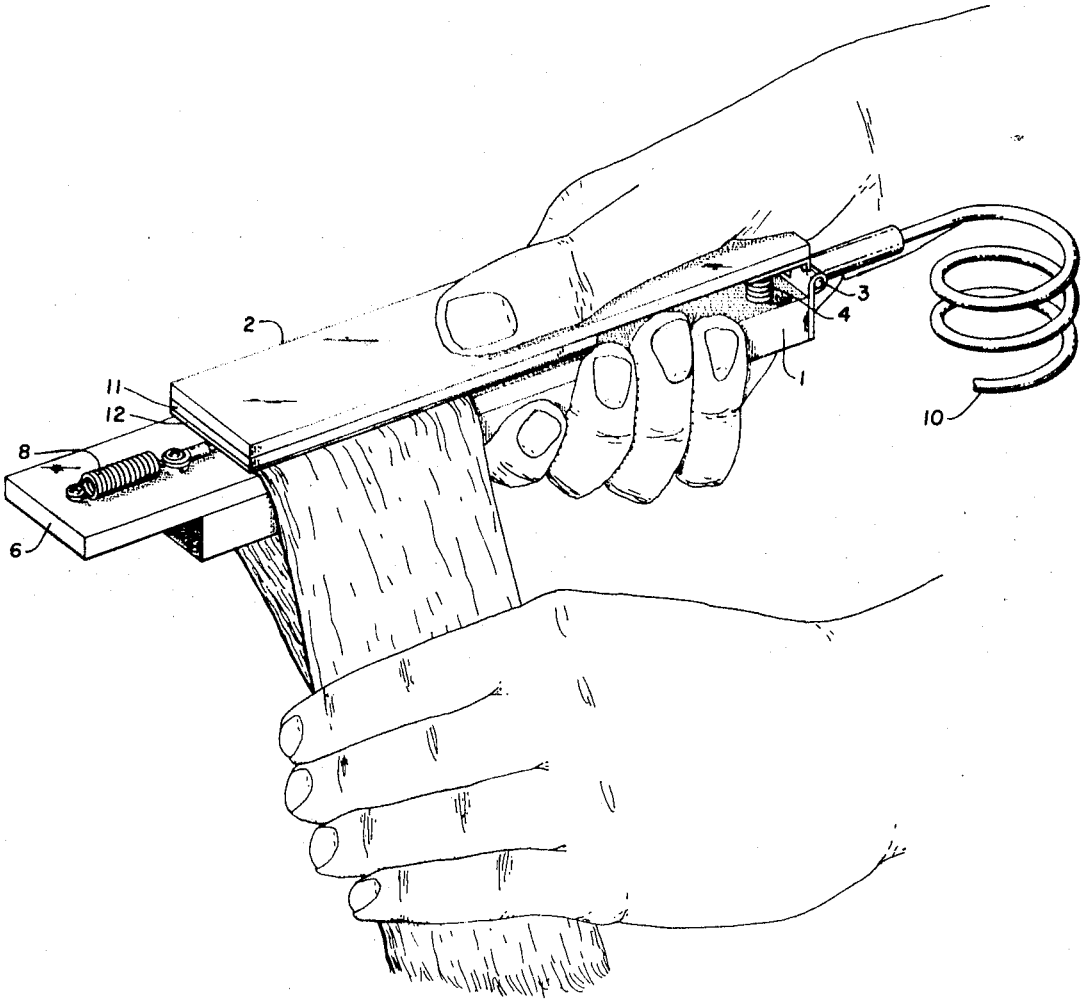

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUGUST 14, 1973

913 O.G. 392

T913,005
METHOD OF TOW SPLICING
Robert E. Duram, Route #10, Galloway Road, Kingsport, Tenn. 37664
Filed Jan. 26, 1973, Ser. No. 327,063
Int. Cl. B65h *69/02*
U.S. Cl. 156—158
3 Sheets Drawing. 4 Pages Specification

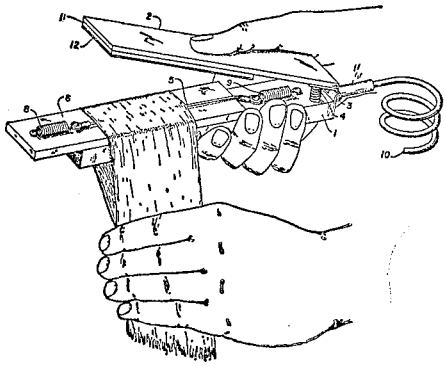

Disclosed is a method of splicing the trailing end of a first tow of thermoplastic fibers to the leading end of a second tow of thermoplastic fibers comprising folding the first and second tows into a "side by side" relationship and heating both tension tows in a region which is substantially perpendicular to the length of the tows so as to thermoplastically splice both tension tows together and sever from the remainder of the tows the portion of both tows from the end of the tows to the heated region. Cellulose acetate fiber is a particularly desirable fiber for use in this invention.

METHOD OF TOW SPLICING

Filed Jan. 26, 1973 3 Sheets-Sheet 1

METHOD OF TOW SPLICING

Filed Jan. 26, 1973 3 Sheets-Sheet 2

METHOD OF TOW SPLICING

Filed Jan. 26, 1973 3 Sheets-Sheet 3